(12) United States Patent
Agin et al.

(10) Patent No.: US 7,843,879 B2
(45) Date of Patent: Nov. 30, 2010

(54) METHOD FOR CONFIGURATION OF A COMPRESSED MODE IN A MOBILE RADIOCOMMUNICATION SYSTEM

(75) Inventors: Pascal Agin, Chatillon (FR); Ghislaine Reybet-Degat, Paris (FR)

(73) Assignee: EVOLIUM S.A.S., Paris (FR)

( * ) Notice: Subject to any disclaimer, the term of this patent is extended or adjusted under 35 U.S.C. 154(b) by 1078 days.

(21) Appl. No.: 10/509,511

(22) PCT Filed: Mar. 28, 2003

(86) PCT No.: PCT/FR03/00980

§ 371 (c)(1),
(2), (4) Date: Jul. 29, 2005

(87) PCT Pub. No.: WO03/084256

PCT Pub. Date: Oct. 9, 2003

(65) Prior Publication Data
US 2005/0286468 A1 Dec. 29, 2005

(30) Foreign Application Priority Data
Mar. 29, 2002 (FR) ................................. 02 04043

(51) Int. Cl.
*H04W 4/00* (2009.01)
(52) U.S. Cl. ...................................... 370/331; 370/329
(58) Field of Classification Search ................ 370/333, 370/332, 331, 329, 528, 342, 441; 445/13, 445/436
See application file for complete search history.

(56) References Cited
U.S. PATENT DOCUMENTS
5,533,014 A * 7/1996 Willars et al. ............... 370/335

6,868,075 B1 * 3/2005 Narvinger et al. ........... 370/335
2001/0008521 A1 * 7/2001 Virtanen ..................... 370/331

(Continued)

FOREIGN PATENT DOCUMENTS
EP 1 117 269 A 7/2001

OTHER PUBLICATIONS

Change Request (CR) "Measurement of Handover" year of publication 2000, 3GPP TGS_RAN Meeting #12, Sophia-Antipolis, France, document R2-002432, spec. 25.922, CR 011, version 3.3.0, issued on Nov. 2000).*

(Continued)

*Primary Examiner*—Steven H Nguyen
*Assistant Examiner*—Syed Bokhari
(74) *Attorney, Agent, or Firm*—Sughrue Mion, PLLC

(57) ABSTRACT

In a method for configuration of a compressed mode in a mobile radiocommunication system, a configuration of a compressed mode defined using the parameters for the compressed mode. The parameters include a transmission gap length (TBVL) and a transmission gap pattern length (TGPL). The transmission gaps are defined in a first transmission time structure specific to a first system and determined relative to a second transmission time structure specific to a second system to permit measures for the second system to be taken in the first system. For each reference configuration, if the duration of the TPGL is such that the transmission gaps occur periodically with fixed position in said second structure, then the TGL is selected to be sufficiently large so that two transmission gaps occur in two of the positions, the closest of which overlap each other with an overlap duration long enough to carry out a measure.

8 Claims, 2 Drawing Sheets

U.S. PATENT DOCUMENTS

| | | | |
|---|---|---|---|
| 2002/0003785 A1* | 1/2002 | Agin | 370/333 |
| 2002/0006119 A1* | 1/2002 | Steudle | 370/329 |
| 2003/0026235 A1* | 2/2003 | Vayanos et al. | 370/342 |
| 2003/0072279 A1* | 4/2003 | Hamalainen et al. | 370/332 |
| 2003/0092382 A1* | 5/2003 | Vayanos et al. | 455/13.4 |

OTHER PUBLICATIONS

Change Request (CR) "Measurement of Handover" year of publication 2000, 3GPP TGS_RAN Meeting #12, Sophia-Antipolis, France, document R2-002432, spec. 25.922, CR 011, version 3.3.0, issued on Nov. 2000).*

"3$^{rd}$ Generation Partnership Project (3GPP); Technical Specification Group Radio Access Network Multiplexing and Channel Coding (FDD) (3G TS 25.212 Version 3.0.0)", 3G TS 25 212 V3.0.0, Oct. 1999, XP002149187 -.

* cited by examiner

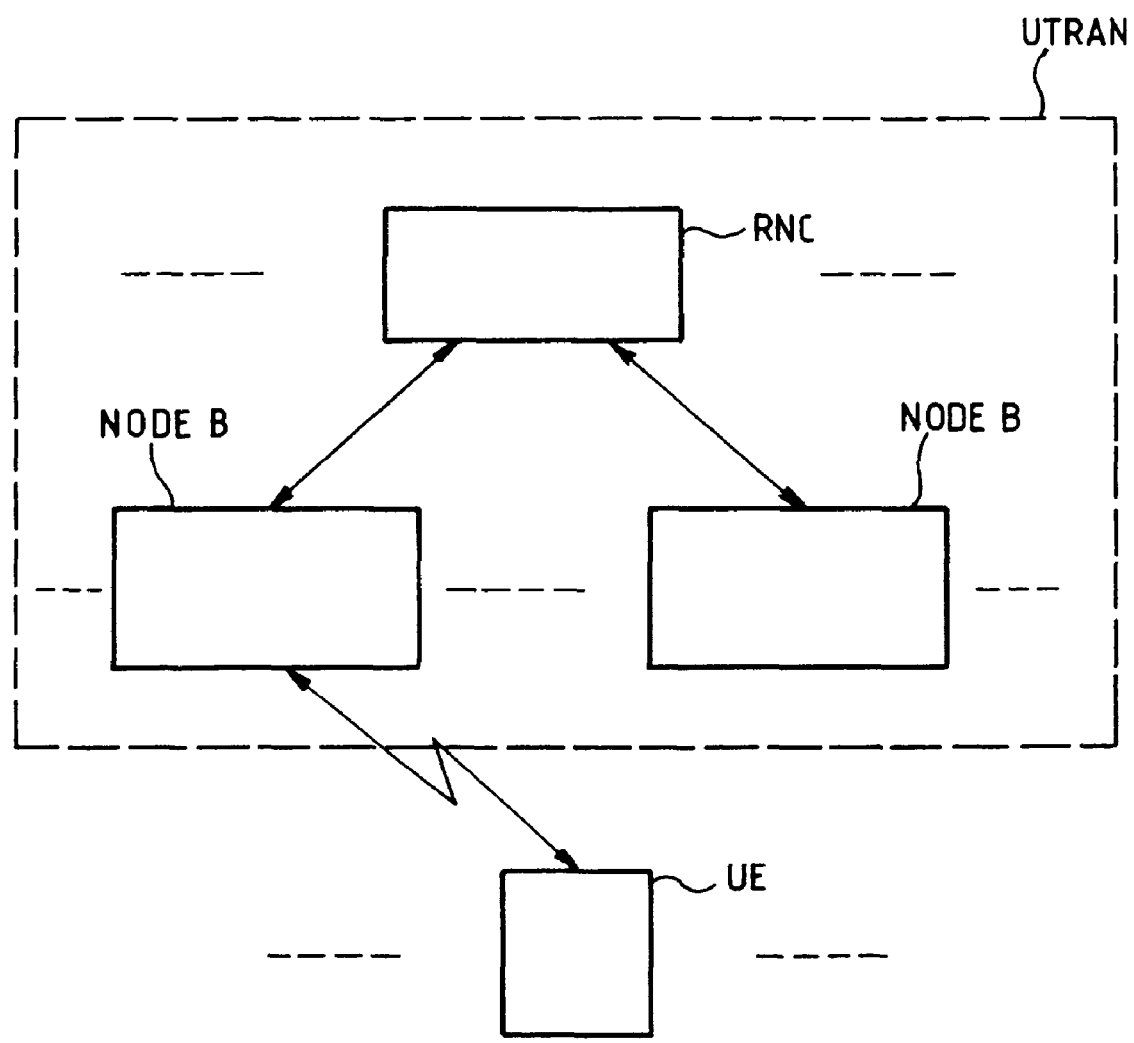

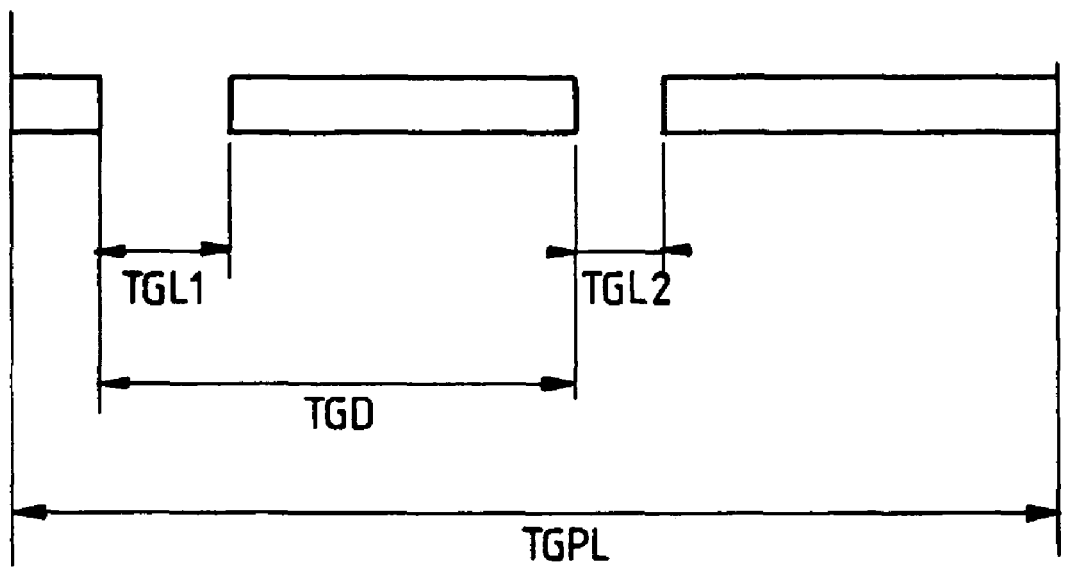
FIG_2

METHOD FOR CONFIGURATION OF A COMPRESSED MODE IN A MOBILE RADIOCOMMUNICATION SYSTEM

The present invention relates generally to mobile radio systems.

The present invention is applicable in particular to code division multiple access (CDMA) systems such as the Universal Mobile Telecommunication System (UMTS) in particular.

As shown in FIG. 1, a mobile radio system generally comprises a radio access subsystem in turn comprising base stations (in the UMTS a base station is also known as a "Node B") and base station controllers (in the UMTS a base station controller is also known as a radio network controller (RNC)). The combination of the Nodes B and the RNCs is also known as the UMTS terrestrial radio access network (UTRAN). The UTRAN communicates with mobile terminals (also known as user equipment (UE)) and with a network and switching subsystem (not specifically shown).

As a general rule, the above systems are the subject of standardization; the corresponding standards published by the corresponding standardization organizations may be consulted for more information on them.

One technique widely used in CDMA systems, such as the UMTS in particular, is transmission in a compressed mode, whereby a transmitter momentarily interrupts its transmission to a receiver on a given frequency to enable the receiver to effect other operations, such as in particular measurements on signals received at frequencies different from said given frequency. These transmission interruptions are also known as transmission gaps. In particular, the compressed mode is used in the downlink direction to enable a mobile terminal to effect measurements on cells adjoining a server cell, in particular to prepare for intercellular transfer (also known as handover). The adjoining cells may be cells using the same radio access technology (RAT) as said server cell or a different radio access technology. Accordingly, in the UMTS, using the code division multiple access (CDMA) technology, the compressed mode may be used to enable a UE to effect measurements on GSM cells using the time division multiple access (TDMA) technology.

Various parameters may be used to configure the compressed mode, in particular according to the type of measurement to be effected. The technical specification 3G TS 25.215 (from which the appended FIG. 2 is taken) defines the following compressed mode parameters in particular:

the transmission gap pattern length (TGPL), expressed as a number of frames, a transmission gap pattern being able to contain not more than two transmission gaps, and the transmission gap length (TGL), expressed as a number of time slots and respectively denoted TGL1, TGL2 in the case of a transmission gap pattern containing two transmission gaps.

It will be remembered that according to the transmission time structure specific to the UMTS, a UMTS frame comprises 15 time slots, the UMTS frame period TF_UMTS is equal to 10 ms, and the UMTS time slot period TS_UMTS is equal to $10/15$ ms, i.e. approximately 0.667 ms.

As specified in the technical specification 3G TS 25.133, the measurements to be effected by a UE on GSM cells include the following two types of measurement in particular:

initial BSIC identification, and

BSIC reconfirmation.

It will be remembered that in a system such as the GSM, the BSIC (base station identity code) enables mobile terminals to distinguish different cells using the same beacon frequency. The BSIC is broadcast at the beacon frequency of each cell on a logical channel called the synchronization channel (SCH) transmitted in time slot 0 of frames 1, 11, 21, 31 and 41 of the multiframe comprising 51 frames as defined in the GSM system standards. It will be remembered that, according to the transmission time structure specific to the GSM, a multiframe comprising 51 frames each comprising 8 time slots within which are transmitted various signals known as bursts corresponding to different logical channels, the GSM multiframe period TMF_GSM is approximately 235.38 ms, the GSM frame period TF_GSM is approximately 4.615 ms, and the GSM time slot period TS_GSM is approximately 0.577 ms.

Furthermore, in the technical specification 3G TS 25.133, the required performance of a UE for the two measurements referred to above is defined for certain compressed mode reference configurations. The required performance of a UE is defined only for these reference configurations, since it is of course impossible to test all possible compressed mode configurations. In particular, for each compressed mode reference configuration two performance constraints are indicated:

N_identify abort: this parameter indicates the maximum number of transmission gap patterns that the UE must use to decode an unknown BSIC in the procedure for initial identification of the BSIC, and T_reconfirm_abort: this parameter indicates the maximum time authorized for reconfirmation of the BSIC in the BSIC reconfirmation procedure.

For the initial identification of the BSIC, a UE must begin by detecting an FCCH burst. This is because information necessary for acquiring synchronization for a GSM cell is broadcast at the beacon frequency of that cell on a logical channel known as the frequency correction channel (FCCH). In this example this channel is broadcast in time slot 0 of frames 0, 10, 20, 30 and 40 of the 51-frame multiframe as defined in the GSM system standards.

For the initial identification of the BSIC, or for reconfirmation of the BSIC, the UE must then detect SCH bursts.

To be able to effect the measurements referred to above, it is therefore necessary for at least some transmission gaps of a set of consecutive transmission gaps to coincide with FCCH/SCH bursts.

However, as the GSM and UMTS cells are not synchronized, this occurs only statistically, i.e. many transmission gaps may be necessary before FCCH/SCH bursts reach the UE during a transmission gap. Note that on average this is more likely to occur if TGL has a high value and/or TGPL has a low value.

The applicant has identified the following problems. For certain values of the time difference between GSM cells and UMTS cells, and for certain compressed mode configurations, it may happen that it is never possible to receive FCCH/SCH bursts during successive transmission gaps. In particular, the applicant has noted that this may occur for values of TGPL that are multiples of 6 if TGL does not have a sufficiently high value.

A particular object of the present invention is to solve the above problems. In particular, one object of the present invention is to optimize the choice of reference compressed mode configurations in the type of application referred to above. More generally, one object of the present invention is to optimize the performance of the compressed mode in such systems.

One object of the present invention is a mobile radio system compressed mode configuration method in which a compressed mode configuration is defined by compressed mode parameters including a transmission gap length TGL and a transmission gap pattern length TGPL, said transmission gaps are defined in a first transmission time structure specific to a first system and are determined relative to a second transmission time structure specific to a second system to enable the first system to effect measurements on the second system, a compressed mode configuration is chosen from a set of reference compressed mode configurations, and said compressed mode parameters are determined so that, for each reference configuration, if the TGPL is such that the transmission gaps occur periodically at fixed positions in said second structure, the TGL is made sufficiently large for two transmission gaps at the two closest together of said positions to overlap by an amount greater than the time needed to effect a measurement.

According to another feature, said compressed mode parameters are determined so that, otherwise, for each reference configuration, TGPL is chosen so that the transmission gaps do not occur periodically at fixed positions in said second structure, or otherwise a transmission gap pattern comprises a plurality of transmission gaps.

According to another feature, the first system is of the UMTS type, the second system is of the GSM type and TGL is chosen from the group comprising the values 11, 12, 13, 14.

According to another feature, TGL preferably has the value 14.

According to another feature, the first system is of the UMTS type, the second system is of the GSM type and TGPL is chosen so that it is not a multiple of 6.

According to another feature, TGPL is chosen from a group comprising the values 13, 14, 15, 16.

According to another feature, for TGPL equal to 13, TGL is chosen from a group comprising the values 5, 7, 10, 14.

According to another feature, for TGPL equal to 16, TGL is chosen from a group comprising the values 7, 10, 14.

According to another feature, the first system is of the UMTS type, the second system is of the GSM type and a transmission gap pattern comprises two transmission gaps.

The invention also provides a compressed mode configuration method in a mobile radio system, in which method a compressed mode configuration is defined by compressed mode parameters, said compressed mode parameters including a transmission gap length TGL and a transmission gap pattern length TGPL, said transmission gaps being defined in a first transmission time structure specific to a first system and being determined relative to a second transmission time structure specific to a second system, to enable measurements on the second system to be effected in the first system, in which method a compressed mode configuration is chosen from a set of reference compressed mode configurations, and for at least one reference configuration TGPL is equal to 13 and TGL is equal to 10.

The present invention also provides a network equipment for a mobile radio system comprising means for implementing the above compressed mode configuration method.

The present invention further provides a mobile terminal for a mobile radio system comprising means for implementing the above compressed mode configuration method.

Other objects and features of the present invention will become apparent on reading the following description of one embodiment, which description is given with reference to the appended drawings, in which:

FIG. 1 depicts the general architecture of a mobile radio system such as the UMTS in particular, and FIG. 2 depicts the compressed mode parameters used in a system such as the UMTS in particular.

The present invention is described hereinafter, by way of example, with more particular reference to the application example referred to hereinabove in which the compressed mode is used to enable a UMTS UE to effect measurements on GSM cells.

The present invention may be explained as follows.

For certain values of the time difference between GSM cells and UMTS cells, and for certain compressed mode configurations, it may happen that it is never possible to receive FCCH/SCH bursts during successive transmission gaps. In particular, the applicant has noted that this may occur for values of TGPL that are multiples of 6 if TGL does not have a sufficiently high value.

This is because the GSM frame duration TF_GSM and the UMTS frame duration TF_UMTS are related by the following equation:

$$13*TF\_GSM = 6*TF\_UMTS$$

Consider, for example, a value of TGPL equal to 24 (i.e. a transmission gap pattern whose duration is equal to 24*TF_UMTS, i.e. 24*10 ms, i.e. 240 ms). If a transmission gap for a first TGPL period occurs at a certain position in the GSM multiframe, the transmission gap for the next TGPL period (240 ms later) will occur at the same position offset by 24*TF_UMTS−TMF_GSM, i.e. 240−235.38 ms, i.e. 4.615 ms, and so on for the subsequent transmission gap patterns. Because of the above equation, the sequence of positions of successive transmission gaps in the GSM multiframe is periodic, i.e. the transmission gaps periodically occur at the same position in the multiframe. In this case, the GSM multiframe will be covered by only 235.38/4.615 transmission gaps, i.e. 51 transmission gaps always occurring at fixed positions in the multiframe. In this case, if the measurement time allowed by a transmission gap is less than TGPL*TF_UMTS−TMF_GSM+TS_GSM, i.e. 240−235.38+0.577 ms, i.e. 5.2 ms, there will be gaps in the multiframe, i.e. certain regions of the multiframe will not be completely covered, and there will therefore be a non-zero probability that the measurements cannot be effected.

As the applicant has also noted, it is necessary to take account of TS_GSM in the above expression. This is because it is necessary for two transmission gaps situated at two consecutive positions to overlap sufficiently for it to be certain, regardless of the position of a GSM time slot in which a measurement is to be effected (i.e. in this example a time slot containing an FCCH or SCH burst), that there is always a transmission gap sufficiently large to contain the whole of that time slot, plus the time necessary for the UE to effect the necessary frequency changes.

The measuring time allowed by a transmission gap is equal to TGL*TS_UMTS−2*Tcom, where Tcom is the time necessary for the UE to change frequency. For example, for the values TGL=10 and Tcom=0.845 ms, this measurement time is 4.98 ms. This value being less than the value of 5.2 ms obtained in the manner explained above in the case of a value of TGPL equal to 24, this kind of configuration therefore does not allow the UE to effect the measurements on GSM cells in a finite time, and therefore should not be included in the reference configurations for which the required performance of a UE is defined for the above types of measurements.

The present invention therefore relates to the compressed mode configuration in a mobile radio system in which a compressed mode configuration is chosen from a set of reference compressed mode configurations defined by compressed mode parameters including a transmission gap length TGL and a transmission gap pattern length TGPL, said transmission gaps are defined in a first transmission time structure specific to a first system and are determined relative to a second transmission time structure specific to a second system to enable the first system to effect measurements on the second system.

The present invention proposes that said compressed mode parameters be determined so that, for each reference configuration, if the TGPL is such that the transmission gaps occur periodically at fixed positions in said second structure, the TGL is made sufficiently large for two transmission gaps at the two closest together of said positions to overlap by an amount greater than the time needed to effect a measurement.

The present invention further proposes that said compressed mode parameters be determined so that, otherwise, for each reference configuration, TGPL is chosen so that the transmission gaps do not occur periodically at fixed positions in said second structure, or otherwise a transmission gap pattern comprises a plurality of transmission gaps.

In the application example considered here:

$TF\_UMTS = 10$ ms $TMF\_GSM = 235.38$ ms $TS\_GSM \approx 0.577$ ms $TGPL*TF\_UMTS - TMF\_GSM + TS\_GSM = 240 - 235.38 + 0.577$ ms $= 5.2$ ms.

As stated above, if TGPL is such that the transmission gaps occur periodically at fixed positions in the GSM multiframe, for a zero probability that the measurements cannot be effected, the transmission gaps must overlap sufficiently. In the present example it is necessary for two transmission gaps to overlap at two of said positions that are the closest together and for the overlap length to be greater than the time needed to effect a measurement.

In the present example, a TGPL such that the transmission gaps occur periodically at fixed positions in the GSM multiframe corresponds to a value of TGPL that is a multiple of 6.

In the present example, the time needed to effect a measurement is equal to $TS\_GSM + 2*Tcom$, where Tcom corresponds to the time needed for the UE to change frequency.

The present invention may also be explained as follows.

The present invention proposes a TGL value choice allowing any value to be chosen for TGPL.

In the example considered here, and for a common value of Tcom of the order of 0.8 ms, the present invention proposes that TGL be made greater than 11, i.e. that TGL be equal to one of the values 11, 12, 13, 14, since in the UMTS the maximum value of TGL is 14.

Alternatively, the present invention proposes to choose TGPL so that it is not a multiple of 6. In this case, the constraints on TGL explained above do not need to be satisfied. The TGPL value may preferably be made equal to one of the values 13, 14, 15 or 16. In this case, low values of TGL may be chosen. Examples are given in the table below:

| TGPL | TGL |
|------|-----|
| 13 | 5 |
| 13 | 7 |
| 13 | 10 |
| 13 | 14 |
| 16 | 7 |
| 16 | 10 |
| 16 | 14 |

Alternatively, the present invention proposes to provide two transmission gaps in a transmission gap pattern in a manner that also reduces the probability that the measurements cannot be effected.

In particular, in the application example considered here, a transmission gap pattern may comprise two transmission gaps.

The present invention further provides, in addition to the compressed mode configuration method explained above, a mobile radio system, a network equipment (such as a base station controller or RNC in a system such as the UMTS in particular), and a mobile terminal (such as a UE in a system such as the UMTS in particular), all comprising means adapted to implement the above method. The particular implementation of such means presenting no particular problem for the person skilled in the art, such means do not need to be described here in more detail than by stating their function, as above.

Examples of such means are given hereinafter.

Such means as provided in a network equipment may comprise in particular means for choosing a compressed mode configuration from a set of reference configurations. Such means may also comprise in particular means for signaling to a mobile terminal compressed mode parameters corresponding to the chosen compressed mode configuration. Such means may further comprise in particular compressed mode transmission and/or receive means, conforming to the chosen compressed mode configuration.

Such means provided in a mobile terminal may comprise in particular means for receiving from a network equipment signaling relating to compressed mode parameters corresponding to a chosen compressed mode configuration. Such means may also comprise in particular compressed mode receive and/or transmission means conforming to the chosen compressed mode configuration.

The invention claimed is:

1. A compressed mode configuration method in a mobile radio system, said method comprising:

choosing a compressed mode configuration from a set of reference compressed mode configurations, the compressed mode configuration being defined by compressed mode parameters including a transmission gap length TGL and a transmission gap pattern length TGPL, by a processor, wherein transmission gaps are defined in a first transmission time structure specific to a first system corresponding to Universal Mobile Telecommunications System (UMTS) and determined relative to a second transmission time structure specific to a second system corresponding to Global System for Mobile communications (GSM), to enable measurements on the second system to be effected in the first system, and said compressed mode parameters are determined so that, for each reference configuration, if the transmission gap pattern length TGPL is a multiple of 6, the transmission gap length TGL is equal to 14, otherwise the transmission gap pattern length TGPL is not a multiple of 6, or otherwise a transmission gap pattern comprises a plurality of transmission gaps.

2. The method according to claim 1, comprising signaling to a mobile terminal the compressed mode parameters corresponding to the chosen compressed mode configuration.

3. A network equipment for a mobile radio system, the network equipment comprising:

means for choosing a compressed mode configuration from a set of reference configurations, the compressed mode configuration being defined by compressed mode parameters including a transmission gap length TGL and a transmission gap pattern length TGPL, wherein transmission gaps are defined in a first transmission time structure specific to a first system corresponding to Universal Mobile Telecommunications System (UMTS) and determined relative to a second transmission time structure specific to a second system corresponding to Global System for Mobile communications (GSM), to enable measurements on the second system to be effected in the first system, and the compressed mode parameters of each reference configuration are determined so that,
  if the transmission gap pattern length TGPL is a multiple of 6, the transmission gap length TGL is equal to 14, otherwise the transmission gap pattern length TGPL is not a multiple of 6, or otherwise a transmission gap pattern comprises a plurality of transmission gaps.

4. The network equipment according to claim 3, comprising means for signaling to a mobile terminal the compressed mode parameters corresponding to the chosen compressed mode configuration.

5. A compressed mode configuration method in a mobile radio system, the method comprising:

choosing a compressed mode configuration from a set of reference compressed mode configurations, the compressed mode configuration being defined by compressed mode parameters including a transmission gap length TGL and a transmission gap pattern length TGPL, by a processor, wherein transmission gaps are defined in a first transmission time structure specific to a first system corresponding to Universal Mobile Telecommunications System (UMTS) and determined relative to a second transmission time structure specific to a second system corresponding to Global System for Mobile communications (GSM), to enable measurements on the second system to be effected in the first system, and the compressed mode parameters are determined so that, for at least one reference configuration, the transmission gap pattern length TGPL is equal to 13 and the transmission gap length TGL is equal to 10.

6. The method according to claim 5, comprising signaling to a mobile terminal the compressed mode parameters corresponding to the chosen compressed mode configuration.

7. A network equipment for a mobile radio system, the network equipment comprising:

means for choosing a compressed mode configuration from a set of reference configurations, the compressed mode configuration being defined by compressed mode parameters including a transmission gap length TGL and a transmission gap pattern length TGPL, wherein transmission gaps are defined in a first transmission time structure specific to a first system corresponding to Universal Mobile Telecommunications System (UMTS) and determined relative to a second transmission time structure specific to a second system corresponding to Global System for Mobile communications (GSM), to enable measurements on the second system to be effected in the first system, and the compressed mode parameters are determined so that, for at least one reference configuration, the transmission gap pattern length TGPL is equal to 13 and the transmission gap length TGL is equal to 10.

8. The network equipment according to claim 7, comprising means for signaling to a mobile terminal the compressed mode parameters corresponding to the chosen compressed mode configuration.

* * * * *